United States Patent [19]

Udagawa

[11] Patent Number: 5,482,298
[45] Date of Patent: Jan. 9, 1996

[54] METAL LAMINATE TYPE CYLINDER HEAD GASKET HAVING GROMMETS WITH DIFFERENT THICKNESSES

[75] Inventor: Tsunekazu Udagawa, Ichikawa, Japan

[73] Assignee: Ishikawa Gasket Co., Ltd., Tokyo, Japan

[21] Appl. No.: 272,339

[22] Filed: Jul. 8, 1994

[30] Foreign Application Priority Data

Jul. 13, 1993 [JP] Japan ................................. 5-038378

[51] Int. Cl.⁶ ................................................. F16J 15/08
[52] U.S. Cl. ................................. 277/180; 277/235 B
[58] Field of Search ................................. 277/180, 234, 277/235 B

[56] References Cited

U.S. PATENT DOCUMENTS 5,131,668  7/1992  Uchida ........................ 277/235 B

FOREIGN PATENT DOCUMENTS

| 483013 | 4/1992 | European Pat. Off. | ........... 277/235 B |
| 593302 | 4/1994 | European Pat. Off. | ........... 277/235 B |
| 61-69450 | 5/1986 | Japan . | |
| 160549 | 7/1986 | Japan | ................. 277/235 B |
| 4-47405 | 11/1992 | Japan . | |

*Primary Examiner*—Scott W. Cummings
*Attorney, Agent, or Firm*—Kanesaka & Takeuchi

[57] ABSTRACT

A metal laminate type cylinder head gasket is formed of at least two metal plates for constituting the gasket. The gasket includes a plurality of cylinder bores arranged in a longitudinal direction, a plurality of first holes situated in longitudinal end areas of the gasket, and at least one second hole situated in a longitudinal middle area of the gasket. The gasket also includes a plurality of first grommets situated in and around the first holes, and at least one second grommet situated in and around the second hole. The thickness of the second grommet is thinner than that of the first grommet. Thus, when the gasket is tightened, tightening pressure is concentrated in the longitudinal middle area to thereby reduce deformation of a cylinder head.

7 Claims, 1 Drawing Sheet

METAL LAMINATE TYPE CYLINDER HEAD GASKET HAVING GROMMETS WITH DIFFERENT THICKNESSES

BACKGROUND OF THE INVENTION AND RELATED ART STATEMENT

The present invention relates to a metal laminate type cylinder head gasket having grommets with different thicknesses to prevent upward expansion or curve of a cylinder head of an engine.

In order to provide high power and light weight for an automobile engine, the engine or at least a cylinder head is made of an aluminum alloy. Since the aluminum alloy does not have high rigidity, when a gasket is installed in the engine, sealing problem between the cylinder head and the cylinder block may occur.

Namely, in case a plurality of cylinder bores is arranged in one or a longitudinal direction, when the gasket is tightened between the cylinder head and the cylinder block by bolts, sealing means situated around the respective cylinder bores are compressed. In this respect, the bolts located in a middle portion of the engine operate to tighten two, i.e. right and left, portions of the sealing means relative to the bolt, while the bolts at the longitudinal ends of the engine only tighten one portion of the sealing means. Thus, the bolts at the longitudinal ends operate to tighten the sealing means at a pressure generally twice as much as the pressure for the rest of the portion of the sealing means.

The unbalanced tightening pressure causes the middle portion of the cylinder head to move upwardly. As a result, the equal sealing pressure is not applied to the sealing means. In a long usage, leaking occurs in the cylinder head or other holes.

In order to support the edges of the cylinder head, beads may be formed. In U.S. Pat. No. 4,834,399, a bead is formed around the entire outer portion of the gasket. However, since the bead completely surrounds the edge portion of the gasket, the bead can not support required portions.

In Japanese Utility Model Publication (KOKAI) No. 61-69450, longitudinal end portions of a gasket are made thicker than a middle portion of the gasket. The thickness of the gasket is adjusted such that the height of beads around the cylinder bores located at the longitudinal end portions is made higher than that around the cylinder bore in the middle portion of the gasket, or that small holes, such as water holes, oil holes and so on, located at the longitudinal end portions are equipped with sealing beads, while a bead is not formed around the small holes at the middle portion.

In the above case, if the beads are compressed for a long time in a high temperature condition, the beads may creep and loose the spring ability. Therefore, the sealing ability decreases in the above case. Also, some of the holes do not have sealing beads to cause a sealing problem.

In Japanese Utility Model Publication (KOKOKU) No. 4-47405, a gasket includes a plate having beads, and a thick plate laminated on the plate, wherein longitudinal ends of the thick plate are folded to form thick portions at the longitudinal ends.

Further, in some cases, the longitudinal ends of a gasket are made thick by beads or extra plates.

Accordingly, one object of the invention is to provide a metal laminate gasket, which can substantially prevent deformation of a cylinder head caused by unbalanced surface pressure on the sealing means.

Another object of the invention is to provide a metal laminate gasket as stated above, wherein all the holes can be securely sealed.

A further object of the invention is to provide a metal laminate gasket as stated above, wherein creep relaxation of the beads used for sealing around the holes can be prevented.

A still further object of the invention is to provide a metal laminate gasket as stated above, which can be easily and economically manufactured.

Further objects and advantages of the invention will be apparent from the following description of the invention.

SUMMARY OF THE INVENTION

A metal laminate type cylinder head gasket of the invention is formed of at least two metal plates for constituting the gasket. The gasket is provided with a plurality of cylinder bores arranged in a longitudinal direction, a plurality of first holes including at least one of the cylinder bores situated in longitudinal end areas of the gasket, and at least one second hole including at least one of the cylinder bores situated in a longitudinal middle area of the gasket. The gasket further includes a plurality of first grommets situated in and around the first holes, and at least one second grommet situated in and around the second hole. The thickness of the second grommet is thinner than that of the first grommet.

Therefore, when the gasket is tightened, the longitudinal middle area is located slightly closer to a cylinder block. Extremely speaking, the middle portion of the cylinder head is urged to dent downwardly. Thus, even if a force to project the middle portion upwardly is applied to the cylinder head by bolts, the cylinder head is substantially linearly or horizontally retained. The deformation of the cylinder head is reduced.

The gasket has two longitudinal end areas. Each longitudinal end area is defined by a longitudinal edge of the gasket and an area of the cylinder bore located in a longitudinal end of the gasket.

The first and second holes may be cylinder bores, bolt holes, water holes, oil holes or push rod holes. However, the cylinder bores may have sealing devices different from the present invention, and the bolt holes, water holes, oil holes or push rod holes may have grommets with different thicknesses based on the location in the gasket according to the invention.

In the invention, one of the two metal plates may have beads around the first and second grommets for sealing around the first and second holes. In this case, when the gasket is tightened, the beads are not completely compressed. Thus, creep relaxation of the beads is prevented. Beads may be formed inside the first and second grommets.

DETAILED DESCRIPTION OF PREFERRED EMBODIMENTS

Figure 1:
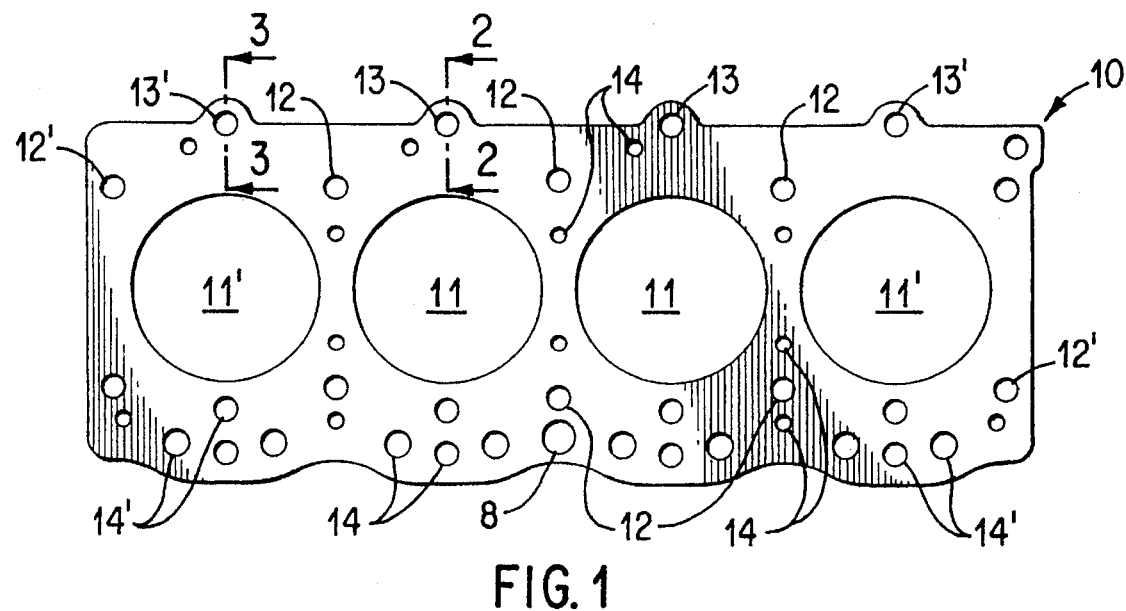
FIG. 1 is an explanatory plan view of a cylinder head gasket of the present invention.

In the drawings, a cylinder head gasket 10 of the invention is shown, wherein four cylinder bores 11, 11' extend linearly along a longitudinal direction. In the gasket 10, areas near the cylinder bores 11' including the longitudinal edges are called longitudinal end areas, while an area between the longitudinal end areas is called a middle area.

The gasket 10 further includes bolt holes 12, 12', oil holes 13, 13', and water holes 14, 14'. The holes 12', 13', 14' are located in the longitudinal end areas, while the holes 12, 13, 14 are located in the middle area.

Figure 2:
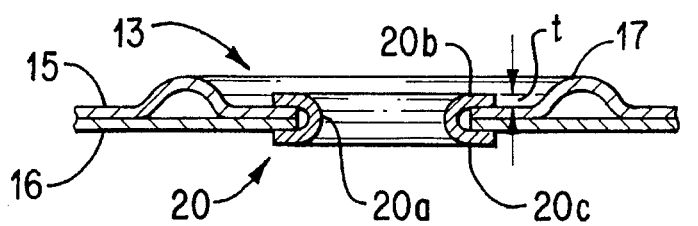
FIG. 2 is an enlarged section view taken along a line 2—2 in FIG. 1.
Figure 3:
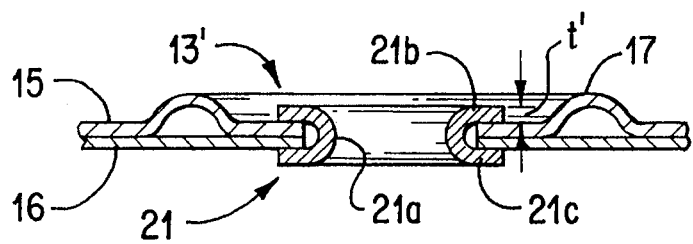
FIG. 3 is an enlarged section view taken along a line 3—3 in FIG. 1.

As shown in FIGS. 2 and 3, the gasket 10 is formed of an upper plate 15 and a lower plate 16 situated under the upper plate 15. The upper plate 15 includes beads 17 around the oil hole 13, 13' for sealing therearound when the gasket is tightened.

Around the oil hole 13, a grommet 20 formed of a curved portion 20a, an upper flange 20b and a lower flange 20c is situated. Around the oil hole 13', a grommet 21 formed of a curved portion 21a, an upper flange 21b and a lower flange 21c is formed. The thickness t of the grommet 20 situated in the middle area of the gasket is thinner than the thickness t' of the grommet 21 situated in the longitudinal end areas.

In the gasket 10, the water holes 14, 14' have grommets, as in the grommets 20, 21. Namely, the grommet around the water hole 14 in the middle area is the same as in the grommet 20, while the grommet around the water hole 14' is the same as in the grommet 21. Beads are also formed on the upper plate 15 to surround the water holes 14, 14'.

In the gasket 10, the bolt holes 12, 12' do not have grommets, but the bolt holes 12, 12' may have the grommet with different thicknesses, as in the grommets 20, 21.

The cylinder bores 11, 11' may be formed of any sealing means. However, the sealing means of the cylinder bores 11, 11' may have a bead and a grommet as in the oil holes 13, 13'. In this case, it is preferable that the grommets for the cylinder bores 11' have the thicknesses greater than those of the grommets for the cylinder bores 11.

When the gasket 10 is situated between a cylinder block and a cylinder head (both not shown) and is tightened, the gasket 10 in the middle area is urged to slightly dent downwardly, because the thickness of the grommet 13 is thinner than that of the grommet 13'. In this respect, the middle area is slightly unbalanced against the longitudinal end areas, but since the bolts at the longitudinal end ares provide strong tightening pressure, the cylinder head is substantially balanced.

In the gasket of the invention, when the gasket is tightened, the beads are not completely flattened by the grommets. Thus, creep relaxation of the beads is prevented. The gasket 10 is formed of two plates, but one or more plates may be laminated together.

Figure 4:
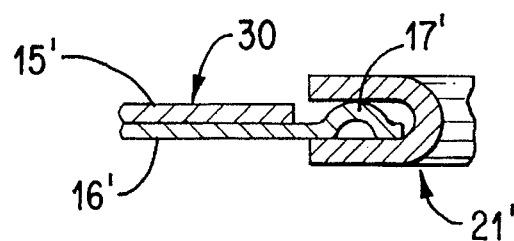
FIG. 4 is an enlarged section view similar to FIG. 3 for showing another example of the invention.

FIG. 4 shows another embodiment 30 of the gasket of the present invention. The gasket 30 is formed of upper and lower plates 15', 16', and grommets 20', 21', as in the gasket 10. However, the lower plate 16' includes a bead 17' situated inside the grommet 21' to surround the oil hole 13'.

When the gasket 30 is tightened between the cylinder head and the cylinder block, the bead 17' is substantially completely compressed and provides surface pressure around the oil hole 13'. Accordingly, the gasket 30 securely seals around the oil hole. The gasket 30 operates as in the gasket 10.

While the invention has been explained with reference to the specific embodiment of the invention, the explanation is illustrative, and the invention is limited only by the appended claims.

What is claimed is:

1. A metal laminate type cylinder head gasket comprising, at least two metal plates for constituting the gasket and having a plurality of cylinder bores arranged in a longitudinal direction, a plurality of first holes including at least one of the cylinder bores situated in longitudinal end areas of the basket, and at least one second hole including at least one of the cylinder bores situated in a longitudinal middle area of the gasket, a plurality of first grommets situated in and around the first holes, and at least one second grommet situated in and around the second hole, the thickness of the second grommet being thinner than that of the first grommet so that when the gasket is tightened, deformation of a cylinder head is reduced.

2. A metal laminate type cylinder head gasket according to claim 1, wherein said gasket has two longitudinal end areas, each longitudinal end area being defined by a longitudinal edge of the gasket and an area of the cylinder bore located in a longitudinal end of the gasket.

3. A metal laminate type cylinder head gasket according to claim 2, wherein said longitudinal middle area is sandwiched between the two longitudinal end areas.

4. A metal laminate type cylinder head gasket according to claim 3, wherein said first and second holes are selected from a group consisting of cylinder bores, bolt holes, water holes, oil holes and push rod holes.

5. A metal laminate type cylinder head gasket according to claim 1, wherein at least one of said two metal plates has beads around the first and second grommets for sealing around the first and second holes.

6. A metal laminate type cylinder head gasket according to claim 5, wherein all the cylinder bores have same sealing means, said first and second holes are selected from a group consisting of bolt holes, water holes, oil holes and push rod holes.

7. A metal laminate type cylinder head gasket according to claim 1, wherein at least one of said two metal plates has beads situated inside the first and second grommets for sealing around the first and second holes.

* * * * *